United States Patent
Brett et al.

(10) Patent No.: US 11,182,160 B1
(45) Date of Patent: Nov. 23, 2021

(54) GENERATING SOURCE AND DESTINATION ADDRESSES FOR REPEATED ACCELERATOR INSTRUCTION

(71) Applicant: NXP USA, Inc., Austin, TX (US)

(72) Inventors: Maik Brett, Taufkirchen (DE);
Christian Tuschen, Holzkirchen (DE);
Sidhartha Taneja, New Delhi (IN);
Tejbal Prasad, Greater Noida (IN);
Saurabh Arora, Ghaziabad (IN);
Anurag Jain, Greater Noida (IN);
Pranshu Agrawal, New Delhi (IN);
Mukul Aggarwal, New Delhi (IN);
Ajay Sharma, Patiala (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/103,000

(22) Filed: Nov. 24, 2020

(51) Int. Cl.
*G06F 9/30* (2018.01)
*G06F 9/38* (2018.01)

(52) U.S. Cl.
CPC ...... *G06F 9/30036* (2013.01); *G06F 9/30065* (2013.01); *G06F 9/30098* (2013.01); *G06F 9/3836* (2013.01); *G06F 9/3877* (2013.01)

(58) Field of Classification Search
CPC .......................... G06F 9/30065; G06F 9/3877
See application file for complete search history.

(56) References Cited

U.S. PATENT DOCUMENTS

| | | | |
|---|---|---|---|
| 3,319,226 A | * | 5/1967 | Mott ........................ G06F 15/16 708/510 |
| 5,113,523 A | | 5/1992 | Colley et al. |
| 5,313,648 A | | 5/1994 | Ehlig et al. |
| 5,559,973 A | | 9/1996 | Gallup et al. |

(Continued)

FOREIGN PATENT DOCUMENTS

CA    1311063    12/1992

OTHER PUBLICATIONS

Tutorialspoint.com, Pascal—Repeat-Until Loop, retrieved from the Internet May 13, 2020, https://www.tutorialspoint.com/pascal/pascal_repeat_until_loop.htm, 2 pages.

(Continued)

*Primary Examiner* — Jyoti Mehta

(57) ABSTRACT

A method and circuit for a data processing system provide a hardware accelerator repeat control instruction (402A) which is executed with a hardware accelerator instruction (402B) to extract and latch repeat parameters from the hardware accelerator repeat control instruction, such as a repeat count value (RPT_CNT), a source address offset value (ADDR_INCR0), and a destination address offset value (ADDR_INCR1), and to generate a command to the hardware accelerator (205) to execute the hardware accelerator instruction a specified plurality of times based on instruction parameters from the hardware accelerator instruction by using the repeat count value to track how many times the hardware accelerator instruction is executed and by automatically generating, at each execution of the (Continued)

hardware accelerator instruction, additional source and destination addresses for the hardware accelerator from the repeat parameters until the hardware accelerator instruction has been executed the specified plurality of times by the hardware accelerator.

20 Claims, 6 Drawing Sheets

(56) References Cited

U.S. PATENT DOCUMENTS

| | | | | |
|---|---|---|---|---|
| 2002/0133692 A1* | 9/2002 | Matsuo | ............... | G06F 9/325 |
| | | | | 712/244 |
| 2004/0223610 A1* | 11/2004 | Henry | ............... | H04L 9/0637 |
| | | | | 380/37 |
| 2009/0106528 A1* | 4/2009 | Koga | ............... | G06F 9/30065 |
| | | | | 712/22 |

OTHER PUBLICATIONS

Oracle.com, IA-32 Assembly Language Reference Manual, Chapter 2 Instruction-Set Mapping, String Instructions, Repeat String Operation (rep, repnz, repz), 2010, https://docs.oracle.com/cd/E19455-01/806-3773/instructionset-64/index.html, 1 page.

Steve Bush, Electronicsweekly.com, NXP Car Radar Processor Gets Hardware Acceleration, Mar. 28, 2018, https://www.electronicsweekly.com/news/products/micros/nxp-car-radar-processor-gets-hardware-acceleration-2018-03/, 4 pages.

NXP, S32R2X: S32R26 and S32R27 Microcontrollers for High-Performance Radar, retrieved from the Internet Oct. 7, 2021, https://www.nxp.com/products/processors-and-microcontrollers/power-architecture/s32r-radar-mcus/s32r26-and-s32r27-microcontrollers-for-high-performance-radar:S32R2X, 4 pages.

* cited by examiner

700

| 127 | 126 | 125 | 124 | 123 | 122 | 121 | 120 | 119 | 118 | 117 | 116 | 115 | 114 | 113 | 112 |
|---|---|---|---|---|---|---|---|---|---|---|---|---|---|---|---|
| \multicolumn{6}{l|}{OPCODE (001111)} | \multicolumn{10}{l|}{Reserved} |
| 111 | 110 | 109 | 108 | 107 | 106 | 105 | 104 | 103 | 102 | 101 | 100 | 99 | 98 | 97 | 96 |
| \multicolumn{3}{l|}{Reserved} | \multicolumn{13}{l|}{RPT_CNT 701} |
| 95 | 94 | 93 | 92 | 91 | 90 | 89 | 88 | 87 | 86 | 85 | 84 | 83 | 82 | 81 | 80 |
| \multicolumn{16}{l|}{Reserved} |
| 79 | 78 | 77 | 76 | 75 | 74 | 73 | 72 | 71 | 70 | 69 | 68 | 67 | 66 | 65 | 64 |
| \multicolumn{16}{l|}{Reserved} |
| 63 | 62 | 61 | 60 | 59 | 58 | 57 | 56 | 55 | 54 | 53 | 52 | 51 | 50 | 49 | 48 |
| \multicolumn{16}{l|}{ADDR_INCR0 702} |
| 47 | 46 | 45 | 44 | 43 | 42 | 41 | 40 | 39 | 38 | 37 | 36 | 35 | 34 | 33 | 32 |
| \multicolumn{16}{l|}{ADDR_INCR1 703} |
| 31 | 30 | 29 | 28 | 27 | 26 | 25 | 24 | 23 | 22 | 21 | 20 | 19 | 18 | 17 | 16 |
| \multicolumn{16}{l|}{ADDR_INCR2 704} |
| 15 | 14 | 13 | 12 | 11 | 10 | 9 | 8 | 7 | 6 | 5 | 4 | 3 | 2 | 1 | 0 |
| \multicolumn{16}{l|}{ADDR_INCR3 705} |

*Figure 7*

GENERATING SOURCE AND DESTINATION ADDRESSES FOR REPEATED ACCELERATOR INSTRUCTION

BACKGROUND OF THE INVENTION

Field of the Invention

The present invention is directed in general to data processing systems and associated methods of operation. In one aspect, the present invention relates to radar system accelerator instructions and associated methods of operation.

Description of the Related Art

Radar systems may be used to detect the range and velocity of nearby targets. With advances in technology, radar systems increasingly use hardware accelerators to offload processing computations from a central processing unit that can be performed more efficiently and quickly in hardware than software. However, in radar use cases, the same accelerator instruction can be required to run multiple times with different start and destination addresses. Each time the accelerator instruction is run, there is an initial pipeline penalty associated with the same. The initial pipeline stages are due to the physical distances encountered in big designs (such as automotive applications) and the resulting parasitic delays seen in wires in lower technology nodes. Also, these pipeline stages are added to reduce logic levels between 2 flops to meet the desired frequency. With 16 way execution, this initial pipeline latency penalty becomes large in cases where an accelerator instruction with short vector length is invoked multiple times. For example, an accelerator instruction with vector length of 16n (e.g., n=1, 2, 4, 8) will require n output cycles with 16 way execution and 16 pipeline latency cycles, for a total of 16+n execution cycles. If the acceleration instruction of vector length 16n is executed 10 times, then this will require 10n output cycles with 16 way execution and 160 pipeline latency cycles, for a total of 10n+160 execution cycles.

As seen from the foregoing, the existing radar accelerator instruction processing solutions are extremely difficult at a practical level by virtue of the challenges of using accelerator instructions which have large initial pipeline latencies that can impair the performance of existing radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 7 depicts selected fields of a repeat instruction in accordance with selected embodiments of the present disclosure.

DETAILED DESCRIPTION

Figure 1:
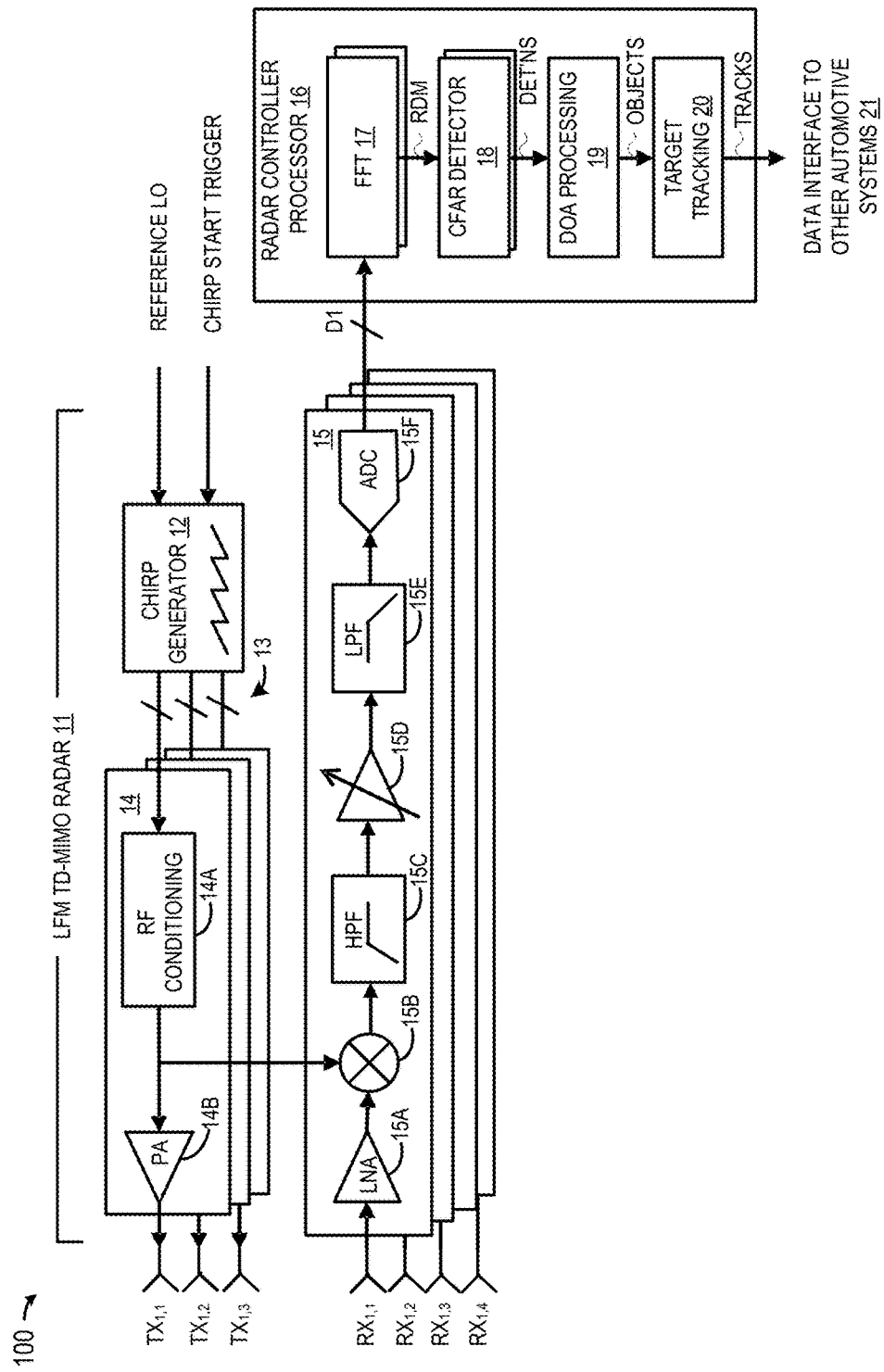
FIG. 1 is a simplified schematic block diagram of a conventional LFM TD-MIMO automotive radar system.

A system, apparatus, and methodology are described for repeatedly executing accelerator instructions in a data processing system by defining a repeat instruction which specifies a repetition count for executing the subsequent accelerator instruction n times by automatically identifying start and destination addresses for each of the n executions of the subsequent accelerator instruction, thereby reducing or eliminating pipeline latency penalties associated with separately executing each accelerator instruction. In selected embodiments, the repeat instruction may be embodied as a processor executable repeat control instruction which is placed in front of a subsequent accelerator instruction that is to be executed multiple times, and which includes specified parameters for repeatedly executing the subsequent accelerator instruction, including a first source address increment parameter (ADDR_INCR0) which specifies an increment for sequentially adjusting the source addresses, a second destination address increment parameter (ADDR_INCR1) which specifies an increment for sequentially adjusting the destination addresses, and a third repetition count parameter (RPT_CNT) which specifies the number of times the next instruction should be repeated. In selected embodiments, the processor executable repeat control instruction may also include a secondary source address increment parameter (ADDR_INCR2) which specifies an increment for the auxiliary address, such as used with secondary reads. Upon executing the processor executable repeat control instruction, the processor executes the subsequent accelerator instruction using a command sequencer to retrieve initial source and destination addresses from the subsequent accelerator instruction, where the retrieved addresses specify the source of the read operation and destination of the store operation, respectively, used by the subsequent accelerator instruction, and then repeatedly executes the subsequent accelerator instruction n=RPT_CNT times by iteratively updating the source and destination addresses with the source address increment (ADDR_INCR0) and destination address increment (ADDR_INCR1) at each execution cycle. Upon execution of the processor executable repeat control instruction, the pipeline latency from setting up the subsequent accelerator instruction is seen only once by the accelerator execution engine. With an example 16 way execution where an acceleration instruction of vector length 16n is executed 10 times, then this will require 10n output cycles with 16 way execution and 16 pipeline latency cycles, for a total of 10n+16 execution cycles, thereby saving 144 execution cycles. In selected embodiments, the subsequent accelerator instruction may also include a REPEAT flag along with additional parameters in case there are wider accelerator instructions.

In the context of the present disclosure, it will be appreciated that radar systems may use hardware accelerators to perform a variety of different functions, including but not limited to fast Fourier transform (FFT) functions, global/local maxima search functions, copy/transpose vector functions, vector math operation functions, histogram calculation functions, and the like. Using such accelerator functions, the radar systems compute the radial distance to a reflecting object and its relative radial velocity. Typically, frequency modulated continuous wave (FMCW) modulation radars are used to identify the distance and/or velocity of a radar target, such as a car or pedestrian, by transmitting Linear Frequency Modulation (LFM) waveforms from multiple transmit antennas so that reflected signals from the radar target are received at multiple receive antennas and processed to determine the radial distance and relative radial velocity and direction for the radar target. However, with current automotive designs, a vehicle can include multiple radar transmitters which can operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 11 connected to a radar controller processor 16. In selected embodiments, the LFM TD-MIMO radar device 11 may be embodied as a line-replaceable unit (LRU) or modular component that is designed to be replaced quickly at an operating location. Similarly, the radar controller processor 16 may be embodied as a line-replaceable unit (LRU) or modular component. Although a single LFM TD-MIMO radar device 11 is shown, it will be appreciated that additional distributed radar devices may be used to form a distributed radar. In addition, the depicted radar system 100 may be implemented in integrated circuit form with the LFM TD-MIMO radar device 11 and the radar controller processor 16 formed with separate integrated circuits (chips) or with a single chip, depending on the application.

Each radar device 11 includes one or more transmitting antenna elements $TX_i$ and receiving antenna elements $RX_j$ connected, respectively, to one or more radio-frequency (RF) transmitter (TX) units 14 and receiver (RX) units 15. For example, each radar device (e.g., 11) is shown as including individual antenna elements (e.g., $TX_{1,i}$, $RX_{1,j}$) connected, respectively, to three transmitter modules (e.g., 14) and four receiver modules (e.g., 15), but these numbers are not limiting and other numbers are also possible, such as four transmitter modules 14 and six receiver modules 15, or a single transmitter module 14 and/or a single receiver module 15. Each radar device 11 also includes a chirp generator 12 which is configured and connected to produce a linear FM-modulated RF signal, such as by supplying a chirp input signal 13 to the transmitter module(s) 14. To this end, the chirp generator 12 is connected to receive a local oscillator (LO) signal and a chirp start trigger signal. Chirp signals 13 are generated and transmitted to multiple transmitters 14, usually following a pre-defined transmission schedule, where they are filtered at the RF conditioning module 14A and amplified at the power amplifier 14B before being fed to the corresponding transmit antenna $TX_{1,i}$ and radiated. By sequentially using each transmit antenna $TX_{1,i}$ to transmit successive pulses in the chirp signal 13, each transmitter element 14 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may by reflected by an object, and part of the reflected radar signal reaches the receiver antenna units $RX_{1,i}$ at the radar device 11. At each receiver module 15, the received (radio frequency) antenna signal is amplified by a low noise amplifier (LNA) 15A and then fed to a mixer 15B where it is mixed with the transmitted chirp signal generated by the RF conditioning unit 15. The resulting intermediate frequency signal is fed to a first high-pass filter (HPF) 15C. The resulting filtered signal is fed to a first variable gain amplifier 15D which amplifies the signal before feeding it to a first low pass filter (LPF) 15E. This re-filtered signal is fed to an analog/digital converter (ADC) 15F and is output by each receiver module 15 as a digital signal D1 which compresses target echo of various delays into multiple sinusoidal tones whose frequencies correspond to the round-trip delay of the echo.

The radar system 100 also includes a radar controller processing unit 16 that is connected to supply input control signals to the radar device 11 and to receive therefrom digital output signals generated by the receiver modules 15. In selected embodiments, the radar controller processing unit 16 may be embodied as a micro-controller unit (MCU) or other processing unit that is configured and arranged for signal processing tasks such as, but not limited to, target identification, computation of target distance, target velocity, and target direction, and generating control signals. The radar controller processing unit 16 may, for example, be configured to generate calibration signals, receive data signals, receive sensor signals, generate frequency spectrum shaping signals (such as ramp generation in the case of FMCW radar) and/or state machine signals for RF (radio frequency) circuit enablement sequences. In addition, the radar controller processor 16 may be configured to program the transmit modules 14 to operate in a time-division fashion by sequentially transmitting LFM chirps for coordinated communication between the transmit antennas $TX_{1,i}$, $RX_{1,j}$. The result of the digital processing at the radar controller processing unit 16 is that the digital domain signals D1 are processed for the subsequent fast-time range FFT and/or slow-time Doppler FFT 17, constant false alarm rate (CFAR) target detection 18, direction of angle processing 19, and target tracking processes 20. For example, the digital output signals D1 may be processed by one or more fast Fourier transform (FFT) modules 17, such as a fast-time (range) FFT module and/or slow-time (Doppler) FFT module, thereby generating the range-Doppler map (RDM). In turn, the RDM outputs are then passed through one or more CFAR detection modules 18 to obtain the range-Doppler peak detections. In turn, the detected peaks may be further processed at the direction of arrival (DOA) processing module 19 to generate objects that are processed with the target tracking module 20 to generate target tracks which are output over the data interface 21 to other automotive devices for further processing or display.

Figure 2:
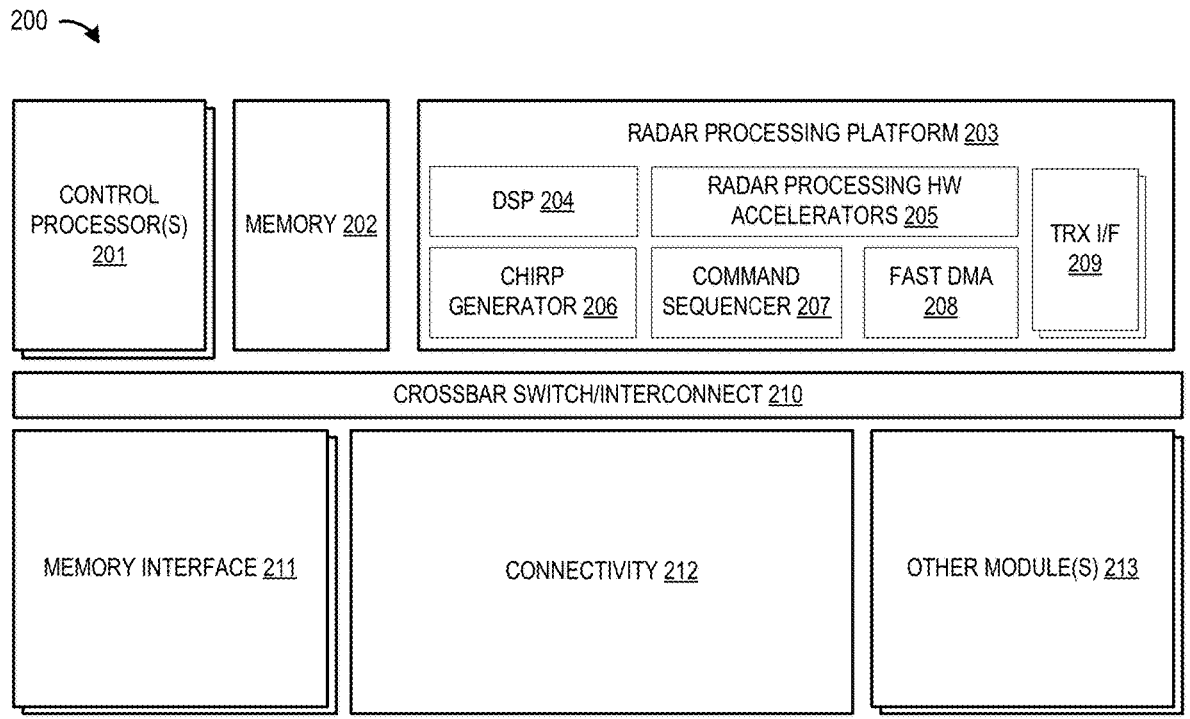
FIG. 2 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 2 which illustrates a simplified architectural block diagram of a microcontroller 200 for automotive and industrial high-performance radar applications which may implement the disclosed system, apparatus, and methodology for repeatedly executing accelerator instructions by defining a repeat instruction which specifies a repetition count and sequence of start and destination addresses for executing the subsequent accelerator instruction. As depicted, the microcontroller 200 includes one or more control processor or central processing unit (CPU) subsystems 201, on-chip memory 202 (e.g., volatile or non-volatile memory), and radar processing platform 203 for providing radar-specific high throughput signal processing. For example, the radar processing platform 203 may include one or more digital signal processor (DSP) cores 204, one or more radar processing hardware accelerators 205, chirp generator 206, command sequencer 207, fast direct memory access (DMA) unit 208, and a transceiver interface 209 to provide transmit and receive module control and processing. The processor(s) 201, on-chip memory 202, and radar processing platform 203 may be connected over an on-chip interconnect 210 to a memory interface 211, (e.g., DDR interface), one or more connectivity modules 212 (e.g., PCIe 2x, FlexPWM, eTimer, IIC, DSPI, etc.), and other modules 213. In selected embodiments, the microcontroller 200 may be implemented as circuitry on a single integrated circuit or system-on-chip (SoC). In addition, the interconnect 210 can be any type of bus structure, including but not limited to a non-coherent interconnect, an advanced high-performance bus (AHB), or an advanced peripheral bus (APB). In addition, the control processor(s) 201 may be any type of processing circuit, including but not limited to a microprocessor (MPU), microcontroller (MCU), digital signal processor (DSP), or another type of processor or processor core with multiple levels of cache memory. Though not shown, the microcontroller 200 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller 200 may use the control processor(s) 201 and or DSP 204 to provide accelerator instructions to the radar processing hardware accelerator(s) 205 that can perform specified functions, such as fast Fourier transform (FFT) functions, global/local maxima search (MAXS) functions, copy/transpose vector (COPY) functions, vector math operation (VMT) functions, histogram calculation (HIST) functions, and the like. Due to the multi-dimensional radar data structures used with such operations (e.g., 2D range-Doppler or even 3D range-Doppler-beam FFT), such functions will often be repeated on different rows and columns of the data. To this end, the DSP 204 may execute a repeat instruction that applies to a referenced accelerator instruction that is provided to the radar processing hardware accelerator 205, where the repeat instruction specifies that the referenced accelerator instruction is to be executed multiple times. To this end, the repeat instruction includes specified parameters for repeatedly executing the referenced accelerator instruction, including a first source address increment parameter (ADDR_INCR0) which specifies an increment for sequentially adjusting the source address for the referenced accelerator instruction, a second destination address increment parameter (ADDR_INCR1) which specifies an increment for sequentially adjusting the destination address for the referenced accelerator instruction, and a third repetition count parameter (RPT_CNT) which specifies the number of times the referenced accelerator instruction should be executed.

Figure 3:
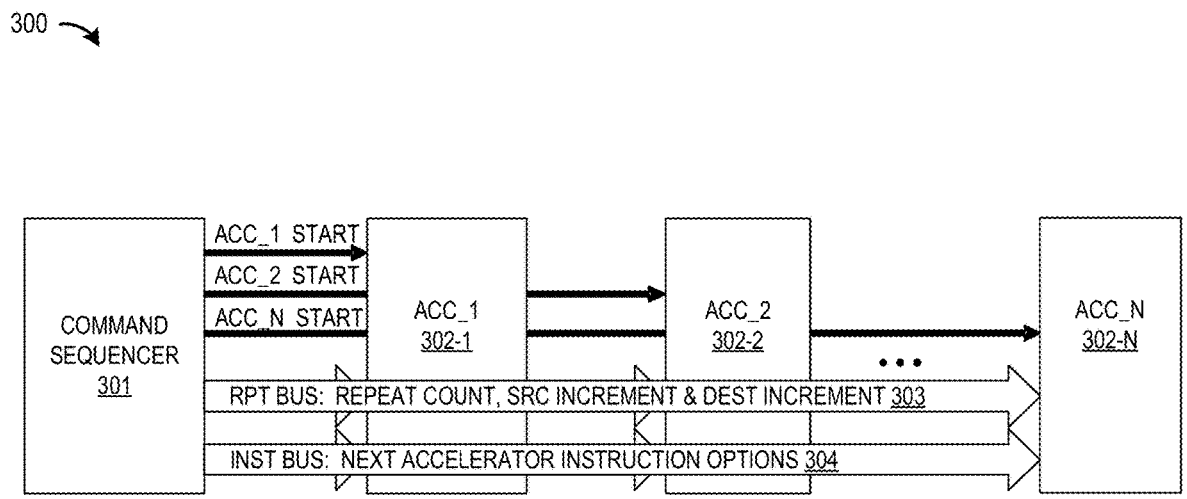
FIG. 3 is a simplified diagrammatic illustration of a command sequencer which issues control parameters to an accelerator to execute a "next" accelerator instruction multiple times under control of a repeat accelerator instruction in accordance with selected embodiments of the present disclosure.

To provide additional details for an improved understanding of selected embodiments of the present disclosure, reference is now made to FIG. 3 which is a simplified diagrammatic illustration 300 of a command sequencer 301 which issues control parameters to an accelerator 302 to execute a "next" accelerator instruction multiple N times (302-1, 302-2, ... 302-N) under control of a REPEAT accelerator instruction. In an example embodiment, the command sequencer 301 reads the REPEAT accelerator instruction and uses the specified parameters (e.g., ADDR_INCR0, ADDR_INCR1, and RPT_CNT) from the REPEAT accelerator instruction to initiate a sequence of start commands (ACC_1 START, ACC_2 START, ... ACC_N START) for each of the N instances of the accelerator 302-1, 302-2, ... 302-N executing the "next" accelerator instruction.

The first start command (ACC_1 START) is constructed by the command sequencer 301 to include a first specified source address and first specified destination address for the accelerator 302 to use when executing the "next" accelerator instruction. As will be appreciated, the command sequencer 301 may generate the first specified source and destination addresses based on the source and destination address information contained in the "next" accelerator instruction, or they may alternatively be specified in the REPEAT accelerator instruction. For each of the 2–N subsequent executions of the accelerator instruction, the command sequencer 301 uses the source and destination increment parameters from the REPEAT accelerator instruction (e.g., ADDR_INCR0, ADDR_INCR1) to sequentially increment the first specified source and destination addresses. Thus, the second start command (ACC_2 START) is constructed by the command sequencer 301 to include a second specified source address (which is generated by incrementing the first specified source address with the first source address increment parameter (ADDR_INCR0)). Likewise, the second start command (ACC_2 START) is constructed by the command sequencer 301 to include a second specified destination address (which is generated by incrementing the first specified destination address with the first destination address increment parameter (ADDR_INCR1)). This process of incrementally increasing the first specified source and destination addresses is continued until the Nth start command (ACC_N START) is constructed to include the Nth specified source address (with N−1 increments of the first specified source address) and the Nth specified destination address (with N−1 increments of the first specified destination address).

Figure 4:
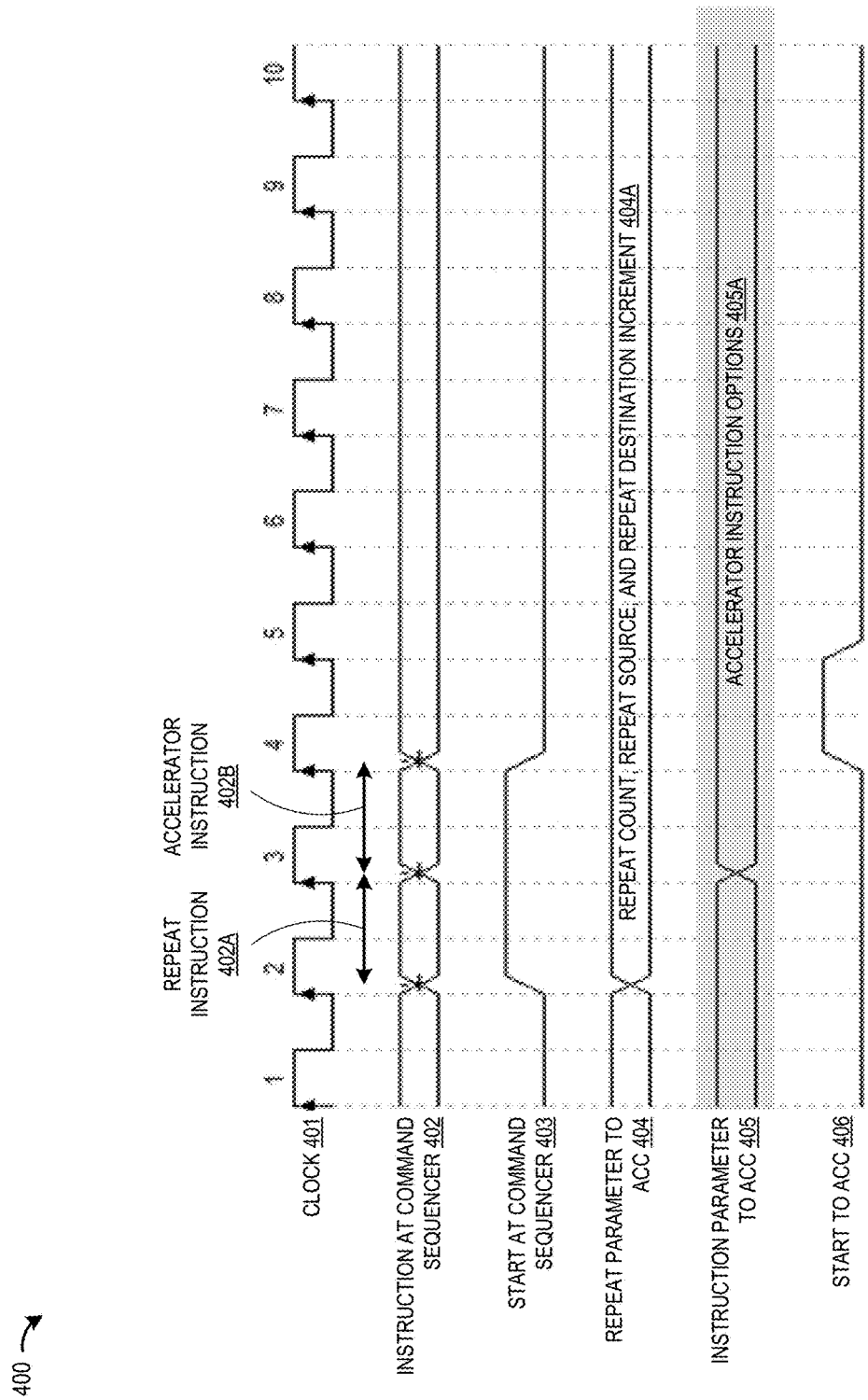
FIG. 4 is a timing diagram illustrating the execution of a repeat accelerator instruction and subsequent accelerator instruction in accordance with selected embodiments of the present disclosure.

In effect, the start commands issued by the command sequencer 301 in response to the REPEAT accelerator instruction provide a repeat bus configuration 303 of the accelerator 302 to execute the "next" accelerator instruction N=RPT_CNT times by iteratively updating the source and destination addresses with the source address increment (ADDR_INCR0) and destination address increment (ADDR_INCR1) at each execution cycle. When the command sequencer 301 then issues the instruction bus configuration 304 of the accelerator 302 to execute the "next" accelerator instruction, each instance of the accelerator 302-1, 302-2, ... 302-N does not require a separate initial pipeline penalty since the REPEAT accelerator instruction effectively configured all N instances at once. As a result of the N executions of the accelerator instruction requiring only a single initial pipeline latency, the REPEAT accelerator instruction provides a mechanism for elimination or reducing latency that otherwise arises in sequentially executing multiple accelerator instructions To provide additional details for an improved understanding of selected embodiments of the present disclosure, reference is now made to FIG. 4 which is a timing diagram illustration 400 of the execution of a repeat accelerator instruction and subsequent accelerator instruction. In particular, a first timing waveform 401 shows the clock pulses that are input to the hardware accelerator. In this example, rising clock pulse edges are used to trigger actions at the command sequencer which responds to the repeat instruction 402A to initialize and repeatedly execute an accelerator instruction 402B at the accelerator hardware.

The second timing waveform 402 shows the relative timing of the instructions that are executed at the command sequencer. In particular, a first repeat instruction 402A is received and executed at the command sequencer at clock pulse 2, and a "next" accelerator instruction 402B is received and executed at the command sequencer at clock pulse 3. In this example, the repeat instruction and accelerator instruction are processed as adjacent instructions, with the operative assumption being that the repeat instruction will repeat the next received instruction N=RPT_CON times. However, if the next received instruction is not an accelerator instruction, then an opcode error will be issued.

The third timing waveform 403 shows the command sequencer's start operation in response to the repeat instruction, where the duration of the command sequencer's start operation is sufficient to receive and process both the repeat instruction and the "next" accelerator instruction. In this example, the start operation begins at clock pulse 2 and ends at clock pulse 4. During start operation, the command sequencer is configured to call the accelerator which is to be used to execute the accelerator instruction and to check accelerator resources for availability before the accelerator instruction is executed. Example accelerator functions include, but are not limited to, fast Fourier transform (FFT) functions, global/local maxima search functions, copy/transpose vector functions, vector math operation functions, histogram calculation functions, and the like.

The fourth timing waveform 404 shows the issuance of the repeat parameters 404A to the hardware accelerator beginning at clock pulse 2 and continuing until all N executions of the accelerator instruction are finished. To this end, the command sequencer may include a read/write address generator circuit which is programmed with the repeat count, repeat source increment, and repeat destination increment values so that it is configured to automatically track the number of executions of the accelerator instructions executions against a total count. In addition, the read/write address generator circuit may be programmed and configured to automatically increment the base source and destination addresses from the accelerator instruction after each repeat execution by the accelerator with the source and destination address increments until the total count is reached.

The fifth timing waveform 405 shows the issuance of the "next" accelerator instruction parameters 405A to the hardware accelerator by the command sequencer beginning at clock pulse 3 and continuing until all N executions of the accelerator instruction are finished. As indicated, the accelerator instruction parameters provided by the command sequencer are used to control the accelerator instruction options. The sixth timing waveform 406 shows the issuance of the "start" command to the accelerator at clock pulse 4 to begin executing the accelerator instruction N times based on the specified repeat parameters and instruction parameters previously issued by the command sequencer.

Figure 5:
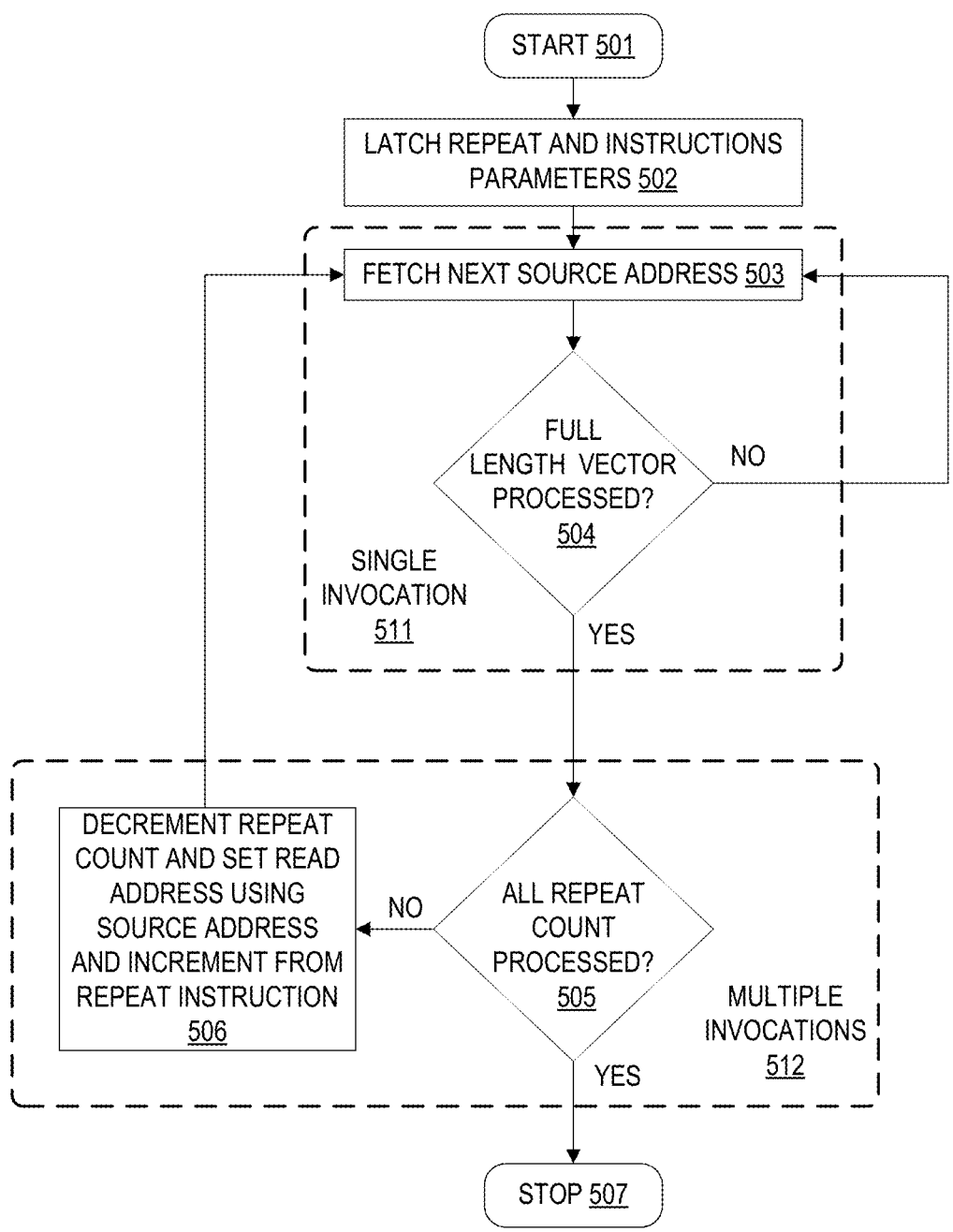
FIG. 5 illustrates a simplified flow chart showing the logic for using a repeat accelerator instruction to reduce latency from executing an accelerator instruction multiple times.

To provide additional details for an improved understanding of selected embodiments of the present disclosure, reference is now made to FIG. 5 which illustrates a simplified flow chart 500 showing the logic for using a repeat accelerator instruction to reduce latency from executing an accelerator instruction multiple times. In an example embodiment, the control logic and methodology shown in FIG. 5 may be implemented as hardware and/or software on a radar processing platform which includes a processor or microcontroller unit, a command sequencer with a read/write address generator circuit, and one or more hardware accelerators. Operating under control programming control code, the radar processing platform is configured to execute the same accelerator instruction multiple times at an accelerator under control of a repeat instruction which provides instruction fields to control the behavior of the accelerator.

The process starts (step 501), such as when the radar system begins the process of sensing the location and movement of one or more target objects using one or more transmit radar signals that are sent over a plurality of transmit antennas. To generate the transmit radar signals, the radar system may generate a reference chirp signal by periodically modulating a transmit radar signal with a frequency and/or phase shift and distributing the modulated chirp signal that is distributed to a plurality of transmit channel circuits which are respectively associated with a plurality of transmit antennas. The transmitted signals then generate target return signals which are received and processed by a plurality of receive channel circuits to generate digital target return signals which are processed at the radar controller processor with one or more accelerator hardware units.

At step 502, the repeat instruction and "next" accelerator instruction are received and processed to latch the repeat and instruction parameters. In particular, the repeat instruction is processed to extract and store repeat parameters from instruction fields in the repeat instruction. Examples of such repeat parameters include, but are not limited to a repetition count parameter (RPT_CNT) which specifies the number of times the next instruction should be repeated, a source address offset or increment parameter (ADDR_INCR0) which specifies an offset for the next operation source, a destination address offset or increment parameter (ADDR_INCR1) which specifies an offset for the next operation destination, and an optional auxiliary address offset or increment parameter (ADDR_INCR2) which specifies an offset for a twiddle or coefficient address. As disclosed herein, the repetition count parameter in the repeat instruction may identify the number of repetitions either as a constant value or as a value that is stored in a writeable register (WREG). In addition, the "next" accelerator instruction is processed to extract and store instruction parameters from instruction fields in the accelerator instruction.

At step 503, the next source address is fetched for at least a first or single invocation 511 of the accelerator instruction. In fetching the next source address for the first time during the first iteration of the flow sequence 500, the base source address from the accelerator instruction. In subsequent iterations of the flow sequence that occur during repeat executions of the accelerator instruction, the next source address may be fetched at step 503 by incrementing the source address from the previous iteration using the source address offset or increment from the repeat instruction. Alternatively, the next source address may be fetched from a read/write address generator circuit which is programmed and configured to automatically increment the base source and destination addresses from the accelerator instruction after each repeat execution by the accelerator with the source and destination address increments until the total count is reached. Though not shown, it will be appreciated that the next destination address may also be fetched in a similar way.

At step 504, a determination is made if the full vector length is processed. If not (negative outcome to detection step 504), then the process returns to fetch the next source address (step 503). However, if the full vector length is processed (affirmative outcome to detection step 504), this indicates that the accelerator has completed a single invocation or execution of the accelerator instruction 511, and the process then proceeds to determine if additional or multiple executions of the accelerator instruction 512 are required.

At step 505, a determination is made if all repeat counts of the accelerator instruction have been processed as specified in the repeat instruction. In selected embodiments, the determination at step 505 may be implemented by storing the repetition count parameter (RPT_CNT) from the repeat instruction in an execution counter Nrep, and then determining if Nrep=0. If the repetition count parameter (e.g., RPT_CNT=0) indicates that only a single execution of the accelerator instruction is required, then all repeat counts have been processed (affirmative outcome to detection step 505), and the process is completed. However, if all repeat counts have not been processed (negative outcome to detection step 505), this indicates that additional or multiple executions 512 of the accelerator instruction are required.

At step 506, an additional invocation of the accelerator instruction is configured by decrementing the repeat count (e.g., Nrep=Nrep-1) and by setting the read address for the next execution of the accelerator instruction by incrementing the source address with the source address offset or increment parameter from the repeat instruction. Though not shown, it will be appreciated that the next write address for the next execution of the accelerator instruction may be set in a similar way by incrementing the destination address with the destination address offset or increment parameter from the repeat instruction. Having updated the source and destination addresses for the next execution of the accelerator instruction, the process returns to step 503 to fetch the next source address (and destination address), and the processing sequence executes another iteration of the processing steps 503-505 until the execution counter Nrep indicates that all repeat counts have been processed (affirmative outcome to detection step 505), at which point the process stops (step 507). At step 507, execution of the accelerator instruction stops, and the process may proceed to execution the next accelerator instruction. Alternatively, the process may proceed to executing another repeat instruction along with a "next" accelerator instruction, thereby repeating the process sequence 501-507 for a new accelerator instruction.

Figure 6:
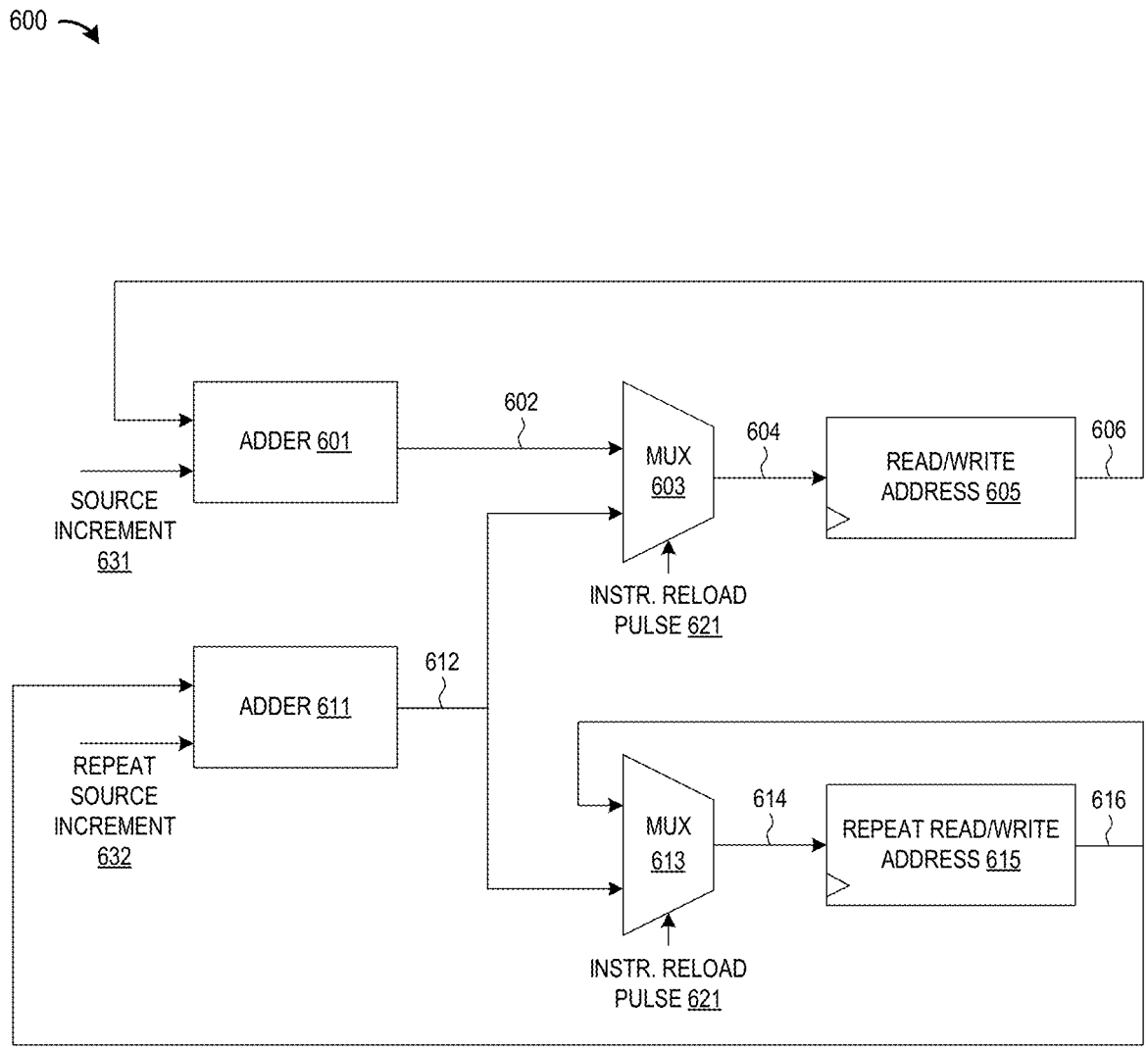
FIG. 6 is a simplified block diagram of a read/write address generator for use with executing repeat accelerator instructions in accordance with selected embodiments of the present disclosure.
Figure 6:
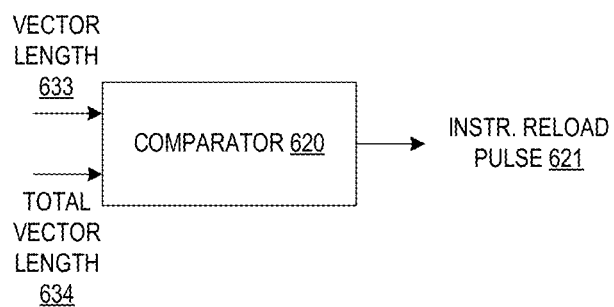

To provide additional details for an improved understanding of selected embodiments of the present disclosure, reference is now made to FIG. 6 which illustrates a simplified block diagram of a read/write address generator 600 for use with executing repeat accelerator instructions. As illustrated, the read/write address generator 600 includes a first adder circuit 601 connected over a first multiplexer 603 to provide a selected multiplex output 604 to a read/write address storage register 605 in response to an instruction reload pulse signal 621 generated by the comparator 620 during a single invocation of the accelerator instruction (e.g., while the single atomic instruction boundary is not reached). In addition, the read/write address generator 600 includes a second adder circuit 611 connected to the first multiplexer 603 and a second multiplexer 613 which provides a selected multiplex output 614 to a repeat read/write address storage register 615 in response to the instruction reload pulse signal 621 during a repeat invocation of the accelerator instruction (e.g., when the atomic instruction boundary is reached).

As depicted, the reload timing of the read/write address generator 600 is controlled by a comparator 620 that is connected to receive a vector length input 633 and a total vector length input 634 which specifies the atomic instruction boundary. During processing of the accelerator instruction, the vector length input 633 is incremented and compared against the total vector length input 634 by the comparator 620 to determine when the atomic instruction boundary is reached when the inputs 633, 634 match, at which point the instruction reload pulse 621 is generated to reload the read/write address generator 600 with read and write addresses for additional executions of the accelerator instruction.

The depicted first adder 601 is used within a single invocation of the accelerator instruction to generate the next read/write address 602. To this end, the first adder circuit 601 is connected to receive a first feedback input 606 from the read/write address storage register 605 which stores the read/write address for an accelerator instruction which is to be incremented. In addition, the first adder circuit 601 is connected to receive a second source increment input 631 which is extracted from the accelerator instruction. With these inputs, the first adder circuit 601 generates the next read/write address 602 by adding the first feedback input 606 from the read/write address storage register 605 to the source increment input 631. Under control of the first multiplexer 603, the next read/write address 602 is provided as the selected multiplex output 604 for storage in the read/write address register 605 until the instruction reload pulse 621 causes the first multiplexer 603 to provide the repeat read/write address 612 as the selected multiplex output 604 for storage in the read/write address register 605. Though not shown, it will be appreciated that a destination increment value may also be provided as an input to the first adder circuit 601 for purposes of incrementing the write address stored at the read/write address storage register 605.

In similar fashion, the depicted second adder 611 is used during repeat invocations of the accelerator instruction to generate the next repeat read/write address 612. To this end, the second adder circuit 611 is connected to receive a second feedback input 616 from the repeat read/write address storage register 615 which stores the repeat read/write address for an accelerator instruction which is to be incremented. In addition, the second adder circuit 611 is connected to receive a second repeat source increment input 632 which is extracted from the repeat instruction. With these inputs, the second adder circuit 611 generates the next repeat read/write address 612 by adding the second feedback input 616 from the repeat read/write address storage register 615 to the repeat source increment input 632. Under control of the second multiplexer 613, the repeat read/write address 616 is provided as the selected multiplex output 614 for storage in the repeat read/write address register 615 until the instruction reload pulse 621 causes the second multiplexer 613 to provide the next repeat read/write address 612 as the selected multiplex output 614 for storage in the repeat read/write address register 615. Though not shown, it will be appreciated that a repeat destination increment value may also be provided as an input to the second adder circuit 611 for purposes of incrementing the write address stored at the repeat read/write address storage register 615.

To provide an example definition of a repeat instruction format, reference is now made to FIG. 7 which depicts selected instruction fields 700 of a repeat instruction. While it will be appreciated that any suitable arrangement and sequencing of instruction fields may be used for the repeat instruction, FIG. 7 shows an example set of instruction fields 700 including a first RPT_CNT instruction field 701 (e.g., bits 96-108) which specifies the number of times the next instruction should be repeated; a second ADDR_INCR0 instruction field 702 (e.g., bits 48-63) which specifies the increment for the source addresses; a third ADDR_INCR1 instruction field 703 (e.g., bits 32-47) which specifies the increment for the destination addresses; a fourth ADDR_INCR2 instruction field 704 (e.g., bits 16-31) which specifies the increment for the auxiliary address usually the secondary reads, and fifth ADDR_INCR3 instruction field 705 which specifies an additional auxiliary address or offset. When the repeat instruction 700 is executed, the processor identifies the next accelerator instruction, and then repeats the operation commands for the identified accelerator instruction for N=RPT_CNT times. If the next instruction following the repeat instruction is not an accelerator instruction, an opcode error will be issued. If the RPT_CNT=1, then the operation commands from the acceleration instruction are executed only once. In each instance, the ADDR_INCR* values are added to the corresponding base addresses of the operation instruction after every repeat of the accelerator instruction.

As disclosed herein, the repeat instruction may be advantageously deployed to perform intra-repetition or inter-repetition to account for scenarios where an operation result varies based on number of operands/vectors. For example, consider a first case where an accelerator instruction performs a sort function on 2 set of 8 vectors, and a second case where the accelerator instruction performs a sort function on 1 set of 16 vectors. In the first case where 16 vector read operations are performed in 1 cycle, a single instruction would need to read the same set of 16 operands twice, resulting in an additional read cycle delay. However, by configuring the repeat instruction to implement an intra-repetition feature which enables the execution of two shorter operations in the time required to perform one operation. As a result, the accelerator may be configured to implement the second case by reading 16 vectors, but performing 2 operations on set of 8 vectors each. In this way, inter-repetition enables to save latency for rescheduling. As will be appreciated, combinations of the intra and inter repetition modes are possible (e.g., 4× repeat of length 8 operations).

By now it should be appreciated that there has been provided a circuit, method and system for eliminating or reducing latency of accelerator instructions executed by a hardware accelerator which may be embodied as a fast Fourier transform hardware accelerator, a global/local maxima search hardware accelerator, a copy/transpose vector hardware accelerator, a vector math operation hardware accelerator, or a histogram calculation hardware accelerator. As disclosed, pipeline latencies from executing accelerator instructions multiple times are eliminated by providing an instruction set architecture (ISA) with a hardware accelerator repeat control instruction which is embodied in non-transitory computer readable storage medium and executed on a processor with a hardware accelerator instruction. In selected embodiments, the hardware accelerator repeat control instruction is a first instruction executed by the processor, and the hardware accelerator instruction is a next instruction executed by the processor after the first instruction. Upon executing the hardware accelerator repeat control instruction, repeat parameters from the hardware accelerator repeat control instruction are extracted and latched, where the repeat parameters may include a repeat count value, a source address offset value, and a destination address offset value. In selected embodiments, the repeat parameters may also include a twiddle or coefficient address offset value. In selected embodiments, the hardware accelerator repeat control instruction is executed to extract the repeat count value as a constant increment value from the hardware accelerator repeat control instruction. In the embodiments, the hardware accelerator repeat control instruction is executed to extract the repeat count value from a specified write register. In addition, instruction parameters from the hardware accelerator instruction are extracted and latched, where the instruction parameters include at least a base source address and a base destination address. Subsequently, a command is generated to the hardware accelerator to execute the hardware accelerator instruction a specified plurality of times based on the instruction parameters by using the repeat count value to track how many times the hardware accelerator instruction is executed by the hardware accelerator and by automatically generating, at each execution of the hardware accelerator instruction, additional source and destination addresses for the hardware accelerator from the repeat parameters until the hardware accelerator instruction has been executed the specified plurality of times by the hardware accelerator. In selected embodiments, the hardware accelerator repeat control instruction is executed to track how many times the hardware accelerator instruction is executed by storing the repeat count value in an execution counter; decrementing the execution counter each time the hardware accelerator instruction is executed by the hardware accelerator; and detecting that the hardware accelerator instruction has been executed the specified plurality of times by the hardware accelerator when the execution counter equals 0. In other embodiments, the hardware accelerator repeat control instruction is executed to generate additional source and destination addresses by incrementing the base source address and base destination address, respectively, with the source address offset value and the destination address offset value.

In another form, there is provided a method, device and system for reducing latency of accelerator instructions executed by a hardware accelerator device, such as a fast Fourier transform hardware accelerator, a global/local maxima search hardware accelerator, a copy/transpose vector hardware accelerator, a vector math operation hardware accelerator, or a histogram calculation hardware accelerator. In the disclosed methodology, a hardware accelerator repeat control instruction and a hardware accelerator instruction are received and executed. In selected embodiments, the hardware accelerator repeat control instruction is received as a first instruction at the hardware accelerator device, and the hardware accelerator instruction is received as a next instruction at the hardware accelerator device after the first instruction. Upon execution of the hardware accelerator repeat control instruction, repeat parameters and instruction parameters are extracted from the hardware accelerator repeat control instruction, where the repeat parameters include a repeat count value, a source address offset value, and a destination address offset value, and where the instruction parameters include a base source address and a base destination address. In addition, the execution of the hardware accelerator repeat control instruction generates a command to the accelerator hardware device to execute the hardware accelerator instruction a specified plurality of times based on the instruction parameters by using the repeat count value to track how many times the hardware accelerator instruction is executed by the hardware accelerator device and by automatically generating, at each execution of the hardware accelerator instruction, additional source and destination addresses for the hardware accelerator device from the repeat parameters until the hardware accelerator instruction has been executed the specified plurality of times by the hardware accelerator device. In selected embodiments, the execution of the hardware accelerator repeat control instruction uses the repeat count value to track how many times the hardware accelerator instruction is executed by storing the repeat count value in an execution counter, decrementing the execution counter each time the hardware accelerator instruction is executed by the hardware accelerator device, and detecting that the hardware accelerator instruction has been executed the specified plurality of times by the hardware accelerator device when the execution counter equals 0. In addition or in the alternative, the execution of the hardware accelerator repeat control instruction generates additional source and destination addresses by incrementing the base source address and base destination address, respectively, with the source address offset value and the destination address offset value. In selected embodiments, the execution of the hardware accelerator repeat control instruction extracts the repeat count value as a constant increment value from the hardware accelerator repeat control instruction or from a specified write register. In addition, the execution of the hardware accelerator repeat control instruction to extract repeat parameters may extract a twiddle or coefficient address offset value from the hardware accelerator repeat control instruction.

In yet another form, there is provided a device, method, and system for reducing or eliminating latency of accelerator instructions. As disclosed, the device includes a hardware accelerator device which may be a fast Fourier transform hardware accelerator, a global/local maxima search hardware accelerator, a copy/transpose vector hardware accelerator, a vector math operation hardware accelerator, or a histogram calculation hardware accelerator. The disclosed device also includes a memory for storing instructions comprising a repeat instruction and a target instruction. In addition, the disclosed device includes a processor configured to sequentially execute the repeat instruction and the target instruction to extract repeat parameters and instruction parameters from the repeat instruction, where the repeat parameters comprise a repeat count value, a source address offset value, and a destination address offset value, and where the instruction parameters comprise a base source address and a base destination address. The processor is also configured to generate a command to the accelerator hardware device to execute the target instruction a specified plurality of times based on the instruction parameters by using the repeat count value to track how many times the target instruction is executed by the hardware accelerator device and by automatically generating, at each execution of the target instruction, additional source and destination addresses for the hardware accelerator device from the repeat parameters until the target instruction has been executed the specified plurality of times by the hardware accelerator device. In selected embodiments, the repeat instruction is executed to track how many times the target instruction is executed by storing the repeat count value in an execution counter, decrementing the execution counter each time the target instruction is executed by the hardware accelerator device, and detecting that the target instruction has been executed the specified plurality of times by the hardware accelerator device when the execution counter equals 0. In other embodiments, the repeat instruction is executed to generate additional source and destination addresses by incrementing the base source address and base destination address, respectively, with the source address offset value and the destination address offset value. In other embodiments, the repeat parameters may include a twiddle or coefficient address offset value. In addition, the repeat instruction may be executed to extract the repeat count value as a constant increment value from the repeat instruction or from a specified write register.

Although the described exemplary embodiments disclosed herein focus on example automotive radar circuits, systems, and methods for using same, the present invention is not necessarily limited to the example embodiments illustrate herein. For example, various embodiments of a repeat instruction for running the same accelerator instruction multiple times may be applied in with other types of instructions, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A non-transitory computer readable storage medium comprising:
   a hardware accelerator repeat control instruction of an instruction set architecture, the hardware accelerator repeat control instruction executed on a processor with a hardware accelerator instruction to:
   extract and latch repeat parameters from the hardware accelerator repeat control instruction, where the repeat parameters comprise a repeat count value, a source address offset value, and a destination address offset value;
   extract and latch instruction parameters from the hardware accelerator instruction, where the instruction parameters comprise a base source address and a base destination address;
   generate a command to the hardware accelerator to execute the hardware accelerator instruction based on the instruction parameters a specified plurality of times by using the repeat count value to track how many times the hardware accelerator instruction is executed by the hardware accelerator and by automatically generating, at each execution of the hardware accelerator instruction, additional source and destination addresses for the hardware accelerator from the repeat parameters until the hardware accelerator instruction has been executed the specified plurality of times by the hardware accelerator.

2. The computer readable storage medium of claim 1, where the hardware accelerator repeat control instruction is a first instruction executed by the processor, and where the hardware accelerator instruction is a next instruction executed by the processor after the first instruction.

3. The computer readable storage medium of claim 1, where the hardware accelerator repeat control instruction is executed to track how many times the hardware accelerator instruction is executed by:
  storing the repeat count value in an execution counter;
  decrementing the execution counter each time the hardware accelerator instruction is executed by the hardware accelerator; and
  detecting that the hardware accelerator instruction has been executed the specified plurality of times by the hardware accelerator when the execution counter equals 0.

4. The computer readable storage medium of claim 1, where generating additional source and destination addresses includes incrementing the base source address and base destination address, respectively, with the source address offset value and the destination address offset value.

5. The computer readable storage medium of claim 1, where the hardware accelerator repeat control instruction is executed to extract the repeat count value as a constant value from the hardware accelerator repeat control instruction.

6. The computer readable storage medium of claim 1, where the hardware accelerator repeat control instruction is executed to extract the repeat count value from a specified write register.

7. The computer readable storage medium of claim 1, where the repeat parameters further comprise a twiddle or coefficient address offset value.

8. The computer readable storage medium of claim 1, where the hardware accelerator comprises a fast Fourier transform hardware accelerator, a global/local maxima search hardware accelerator, a copy/transpose vector hardware accelerator, a vector math operation hardware accelerator, or a histogram calculation hardware accelerator.

9. A method comprising:
  receiving a hardware accelerator repeat control instruction and a hardware accelerator instruction; and
  executing the hardware accelerator repeat control instruction to:
  extract repeat parameters and instruction parameters from the hardware accelerator repeat control instruction, where the repeat parameters comprise a repeat count value, a source address offset value, and a destination address offset value, and where the instruction parameters comprise a base source address and a base destination address, and
  generate a command to hardware accelerator device to execute the hardware accelerator instruction based on the instruction parameters a specified plurality of times by using the repeat count value to track how many times the hardware accelerator instruction is executed by the hardware accelerator device and by automatically generating, at each execution of the hardware accelerator instruction, additional source and destination addresses for the hardware accelerator device from the repeat parameters until the hardware accelerator instruction has been executed the specified plurality of times by the hardware accelerator device.

10. The method of claim 9, where receiving the hardware accelerator repeat control instruction and the hardware accelerator instruction comprises receiving the hardware accelerator repeat control instruction as a first instruction at the hardware accelerator device, and receiving the hardware accelerator instruction as a next instruction at the hardware accelerator device after the first instruction.

11. The method of claim 9, where using the repeat count value to track how many times the hardware accelerator instruction is executed comprises:
  storing the repeat count value in an execution counter;
  decrementing the execution counter each time the hardware accelerator instruction is executed by the hardware accelerator device; and
  detecting that the hardware accelerator instruction has been executed the specified plurality of times by the hardware accelerator device when the execution counter equals 0.

12. The method of claim 9, where generating additional source and destination addresses includes incrementing the base source address and base destination address, respectively, with the source address offset value and the destination address offset value.

13. The method of claim 9, where executing the hardware accelerator repeat control instruction comprises extracting the repeat count value as a constant value from the hardware accelerator repeat control instruction.

14. The method of claim 9, where executing the hardware accelerator repeat control instruction comprises extracting the repeat count value from a specified write register.

15. The method of claim 9, where executing the hardware accelerator repeat control instruction to extract repeat parameters comprises extracting a twiddle or coefficient address offset value from the hardware accelerator repeat control instruction.

16. The method of claim 9, where the hardware accelerator device comprises a fast Fourier transform hardware accelerator, a global/local maxima search hardware accelerator, a copy/transpose vector hardware accelerator, a vector math operation hardware accelerator, or a histogram calculation hardware accelerator.

17. A device, comprising:
  a hardware accelerator device comprising a fast Fourier transform hardware accelerator, a global/local maxima search hardware accelerator, a copy/transpose vector hardware accelerator, a vector math operation hardware accelerator, or a histogram calculation hardware accelerator;
  a memory for storing instructions comprising a repeat instruction and a target instruction; and
  a processor configured to sequentially execute the repeat instruction and the target instruction to:
  extract repeat parameters and instruction parameters from the repeat instruction, where the repeat parameters comprise a repeat count value, a source address offset value, and a destination address offset value, and where the instruction parameters comprise a base source address and a base destination address, and
  generate a command to the hardware accelerator to execute the target instruction a specified plurality of times based on the instruction parameters by using the repeat count value to track how many times the target instruction is executed by the hardware accelerator device and by automatically generating, at each execution of the target instruction, additional source and destination addresses for the hardware accelerator device from the repeat parameters until the target instruction has been executed the specified plurality of times by the hardware accelerator device.

18. The device of claim 17, where the repeat instruction is executed to track how many times the target instruction is executed by:

storing the repeat count value in an execution counter;

decrementing the execution counter each time the target instruction is executed by the hardware accelerator device; and detecting that the target instruction has been executed the specified plurality of times by the hardware accelerator device when the execution counter equals 0.

19. The device of claim 17, where generating additional source and destination addresses by includes incrementing the base source address and base destination address, respectively, with the source address offset value and the destination address offset value.

20. The device of claim 17, where the repeat parameters further comprise a twiddle or coefficient address offset value, and where the repeat instruction is executed to extract the repeat count value as a constant value from the repeat instruction or from a specified write register.

* * * * *